United States Patent
Brittingham

[15] 3,664,505
[45] May 23, 1972

[54] OIL COLLECTION DEVICE

[72] Inventor: Charles J. Brittingham, 112 Wooden Bridge Road, Holland, Pa. 18966

[22] Filed: Feb. 18, 1970

[21] Appl. No.: 12,200

[52] U.S. Cl. ....................................210/242, 210/DIG. 21
[51] Int. Cl. ..........................................................C02b 9/02
[58] Field of Search......................210/83, 242, 523, 84, 153, 210/154, DIG. 21

[56] References Cited

UNITED STATES PATENTS

| | | |
|---|---|---|
| 3,523,611 | 8/1970 | Fitzgerald...............................210/242 |
| 3,219,190 | 11/1965 | Thune....................................210/523 |
| 3,081,879 | 3/1963 | Schroeder et al........................210/523 |
| 3,465,882 | 9/1969 | Bowersox...............................210/154 |

*Primary Examiner*—Reuben Friedman
*Assistant Examiner*—T. A. Granger
*Attorney*—Denny & Denny

[57] ABSTRACT

Floating collection apparatus for skimming oil slicks from a body of water. The oil and water is subjected to pressure generated by the weight and movement of the apparatus to eliminate the water adjacent to and entrained in the oil film prior to sending the oil to a collection tank.

4 Claims, 10 Drawing Figures

INVENTOR.
CHARLES J. BRITTINGHAM
BY
Denny and Denny
HIS ATTORNEYS.

PATENTED MAY 23 1972 3,664,505

INVENTOR.
CHARLES J. BRITTINGHAM
BY
Denny and Denny
HIS ATTORNEYS.

OIL COLLECTION DEVICE

BACKGROUND OF THE INVENTION

Spilled oil and the like is becoming a serious pollution problem in rivers, bays and oceans. However, it is difficult to collect spilled oil economically because it floats as a thin layer or slick on the surface of the water and water is entrained with the oil. Various attempts have been made to encircle a portion of the oil-water mixture and to pump it and the adjacent layer of water into a settling tank from where the oil is sent to a storage tank on the collection vessel or on an accompanying vessel. Such procedures have been found to be unsatisfactory because of the large amounts of water that must be handled in a vessel in order to collect relatively small amounts of oil.

SUMMARY OF THE INVENTION

I have found that if I can concentrate and pressurize and oil slick that I can substantially reduce or eliminate the entrained water from such oil before it is taken from the river or ocean. The concentrated oil eliminates the need for settling tanks and markedly reduces the amount of liquid that must be handled. To pressurize the oil-water mixture I force the oil beneath the vessel and below the normal surface of the water. The oil tends to concentrate in commercially collectible quantities beneath the vessel while at the same-time the water is free to escape from beneath the barriers projecting from the underside of the hull of the collecting vessel.

To concentrate and collect the oil the vessel is provided with a V-shaped longitudinal frame depending from and extending along the underside of the hull. The mouth of the frame is adjacent the forward end of the vessel and the neck of the frame is located near the stern of the vessel beneath a pressure chamber. The bottom of the hull forms a top for the V frame except for a relatively narrow area adjacent the top edges of the frame which is enclosed by a false hull to form riser chambers. The tops of the riser chambers extend into the hull and are thus above the bottom of the hull. The neck of the frame opens into a pressure chamber located within the hull of the vessel near the stern. The bottom of the frame is open. The sides of the frame are tapered from stem to stern and are preferably inclined toward each other.

The oil-water mixture enters at the mouth of the frame and as the vessel moves over the slick the oil-water mixture is, progressively, forced more and more deeply beneath the surface of the water due to inclination of the bottom of the hull relative to the surface of the water. It is my belief that the oil tends to separate from the water under such pressure and to move toward either side of the frame into the riser chambers.

Each riser chamber contains an upper strata of substantially water free oil and such strata becomes of greater depth as it proceeds toward the rear of the vessel. Such riser chambers come together at the mouth of the pressure chamber, the water free oil occupying the upper portion of the pressure chamber.

Additional pressure can be created in the pressure chamber by pivoting a force or pressure plate beneath the mouth of the pressure chamber so that its lowermost edge is substantially below the pressure chamber and the plane of the force plate is at an acute angle relative to the surface of the water. The force plate is movable horizontally on a pair of tracks permitting adjustment of the force plate relative to the mouth of the pressure chamber. The force plate causes a piston effect on the oil and water in the pressure chamber and tends to drive the oil upwardly and rearwardly toward the exit of the pressure chamber. At the same time the heavier water can escape through the mouth of the pressure chamber to the rear of the force plate.

During the start-up of operations no oil is drawn from the pressure chamber until there is a substantial pocket of water free oil in the chamber. Thereafter oil is withdrawn at a rate that will not exceed the accumulation so as to provide at all times a reservoir of oil under pressure in the chamber.

While it is possible to operate the collection vessel at rest in a moving body of water, it is generally advantageous to provide either towing means or self-propulsion means to move the vessel through the water at a speed which will result in a maximum concentration of oil in the riser chambers and pressure chamber of the vessel and a minimum escape of the oil from beneath the vessel.

An object of my invention is to separate oil slicks floating on the open surface of a body of water and to substantially eliminate any water from the oil before bringing the oil aboard the collection or storage vessel.

Another object of my invention is to use the weight and motion of the collection vessel to apply pressure to oil entrapped beneath the collection vessel to thereby separate the oil from the surrounding water.

A still further object of my invention is to reduce to a minimum the frothing of the oil-water mixture while it is being gathered beneath the collection vessel and to use the forward motion of the vessel to drive the oil up into the collection vessel.

A still further object of my invention is to provide adjustment means in the vessel so as to incline the vessel with reference to the surface of the water and to counter changes in the floating angle of the vessel caused by the weight of the oil collected.

Figure 1:
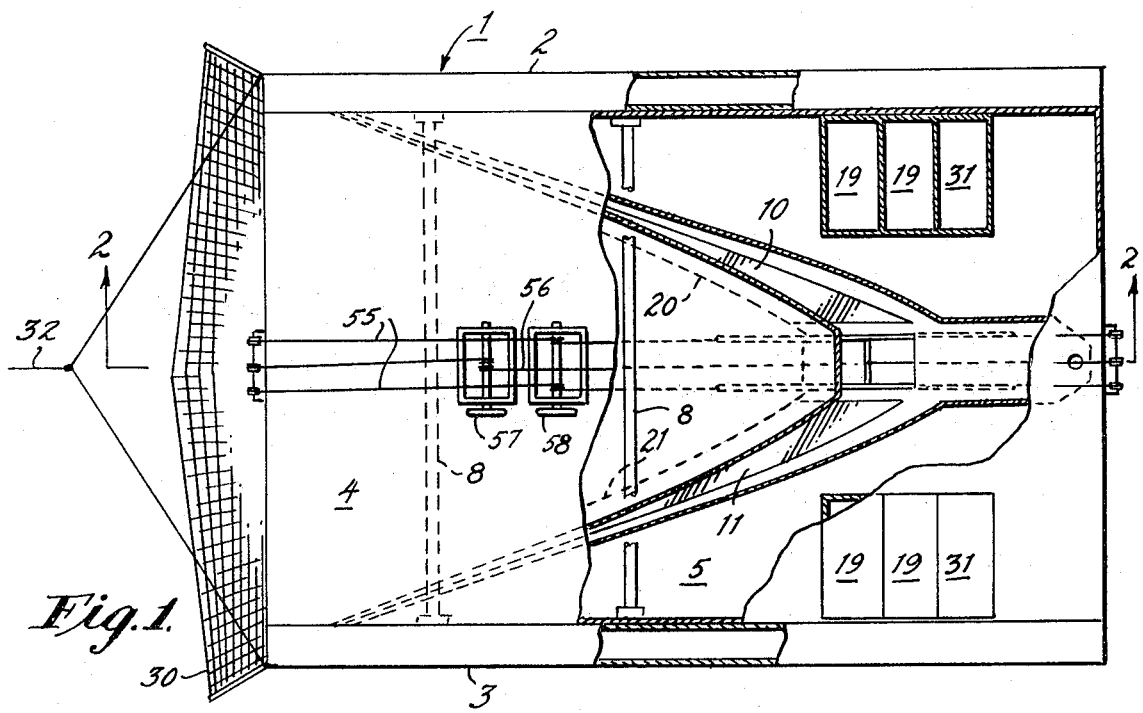
FIG. 1 is a top plan view of the vessel with the top deck and collector tanks partially broken away.

As shown in the drawings, the vessel 1 has a pair of side flotation tanks 2 and 3 which are joined by a divided bottom hull having a front V-section 4 and a rear mating section 5 which are longitudinally spaced apart and provide entry to the riser chambers 6 and 7 hereinafter described. Lateral braces 8 connect the sections 4 and 5 together and to the flotation tanks 2 and 3 to provide rigidity for the vessel.

The spaces 10 and 11 between the bottom hull sections 4 and 5 are enclosed by raised waterproof housings or false hulls 12 and 13 joined to the juxtaposed edges of the sections 4 and 5 and form a watertight seal therewith. Such housings 12 and 13 come together and join with the housing 15 of pressure chamber 16 near the stern of the vessel, as may be seen in FIGS. 2 and 3.

Figure 5:
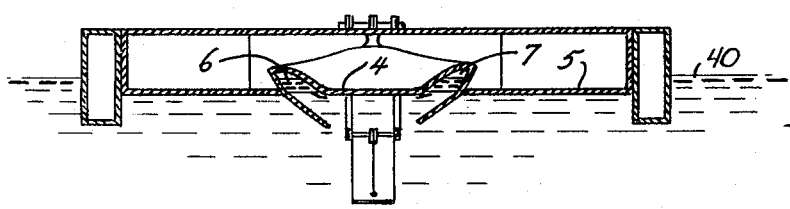
FIG. 5 is a front elevational view of the vessel taken along the line 5—5 of FIG. 2.
Figure 6:
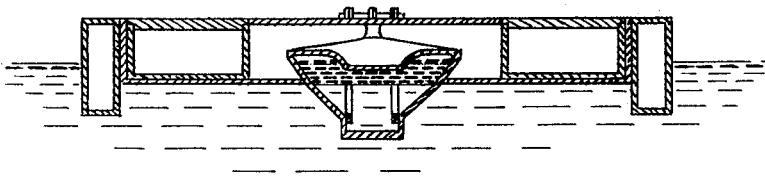
FIG. 6 is a front elevational view of the vessel taken along the line 6—6 of FIG. 2.
Figure 7:
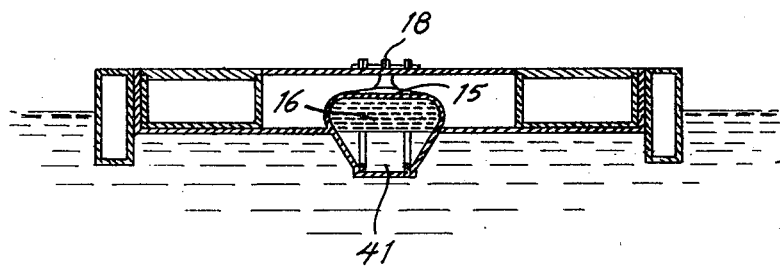
FIG. 7 is a front elevational view of the vessel taken along the line 7—7 of FIG. 2.

The oil riser chambers 6 and 7 formed by the raised housings 12 and 13 increases substantially in cross sectional area toward the rear of the vessel. Compare FIGS. 3 and 5. A still larger cross sectional area is provided in the pressure chamber 16 when the riser chambers 6 and 7 flare together. See FIGS. 6 and 7. The bottoms of the riser chambers 6 and 7 are open to the sea water throughout their lengths. The mouth 17 of the pressure chamber 16 is also open to the water from which the oil is being collected.

Figure 2:
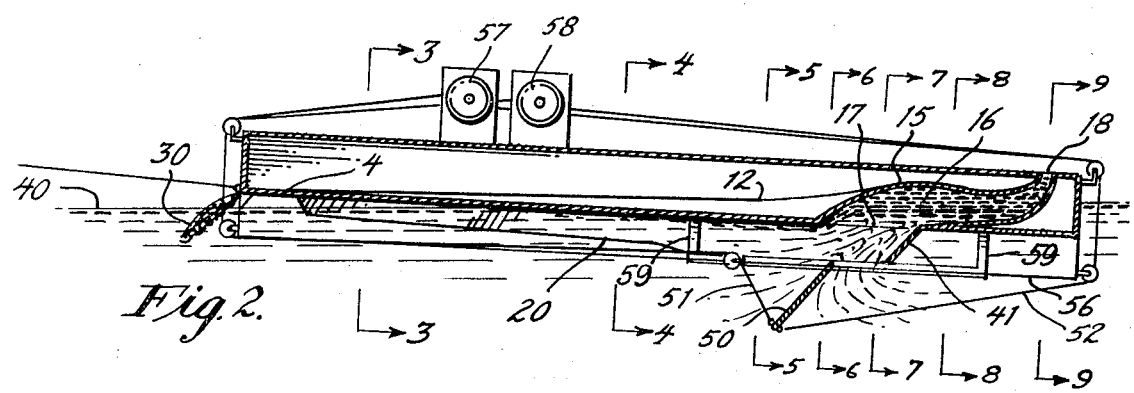
FIG. 2 is a side elevational, cross sectional view of the vessel taken along the line 2-2 of FIG. 1.
Figure 8:
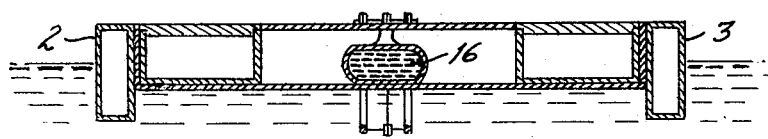
FIG. 8 is a front elevational view of the vessel taken along the line 8—8 of FIG. 2.

As illustrated in FIGS. 2 and 8 the pressure chamber 16 is closed except at the mouth 17 and the outlet 18. The pressure chamber outlet 18 is constricted and connected to a collection pipe or hose (not shown) through which the oil may be delivered to one of the storage tanks 19 located on the vessel 5 or to a storage vessel nearby. The necessary distribution pressure may be obtained from the forward motion of the collection vessel or by pumping means in the usual manner.

Figure 3:
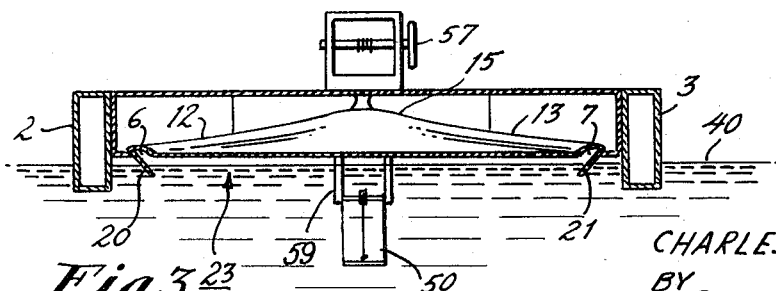
FIG. 3 is a front elevational view of the vessel taken along the line 3—3 of FIG. 2.
Figure 4:
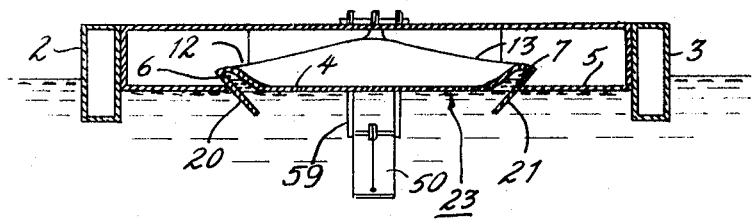
FIG. 4 is a front elevational view of the vessel taken along the line 4—4 of FIG. 2.

Depending from the underside of the hull section 5 adjacent the spaces 10 and 11 are tapered members 20 and 21 which together form a V-shaped collection frame 23. As shown in FIGS. 1 and 3 the mouth of the collection frame extends substantially across the width of the vessel near the bow and narrows toward the center line of the vessel. The frame terminates in a neck adjacent the mouth 17 of the pressure chamber 16. The frame members 20 and 21 are tapered from bow to stern so that the extend most deeply into the water near the stern of the vessel. Preferably the frame members 20 and 21 are inclined toward each other (see FIGS. 3 and 4) but they may extend into the water at right angles to the plane of the hull section 5. The top of frame 23 is enclosed at the top by the hull section 4 and the false hulls 12 and 13. The frame 23 is completely open to the water at the bottom.

A screen 30 may be provided on the bow of the vessel to divert solid debris away from the vessel and the riser chambers. Ballast tanks 31 are provided to trim the vessel. Appropriate rudders, guidance vanes and self-propulsion means may be provided but are not illustrated as they form no part of this invention and are not necessary to an understanding thereof.

In operation, the vessel 1 is towed by means of a line 32 (or self-propulsion means may be used) through the oil coated water at slow to moderate speeds. The ballast tanks 31 are adjusted so that bottom hull section 4 of the vessel has an angle of inclination to the water as generally shown in FIG. 2. That is, the oil contaminated water 40 will engage the under side of the hull section 4 slightly aft of the mouth of the collection frame 23.

As may be seen in FIG. 3, the under side of the hull section 4 together with the members 20 and 21 and the riser chambers 6 and 7 form a collection means which is open at the bottom. Thus, the water is free to leave at the bottom but the oil will seek to rise to the top of the water and will tend to concentrate in the riser chambers 6 and 7, the tops of which are higher than the bottom of the hull section 4. The movement of the vessel forward forces the oil-water mixture progressively deeper as it moves over the mixture and thereby produces progressively greater pressure on the oil. The oil under pressure will tend to separate more rapidly from the water and will rise into the riser chambers 6 and 7. The amount of oil collected under the vessel will, normally, be less than the depth of the frame members so that no oil will escape under the side members.

The joinder member 41 at the juncture of the frame members 20 and 21 will, as a result of the forward motion of the vessel 1, exert additional pressure on the oil-water mixture in the pressure chamber 16 to force the oil from the outlet 18 and, also, to assist in freeing the water from the oil.

Figure 10:
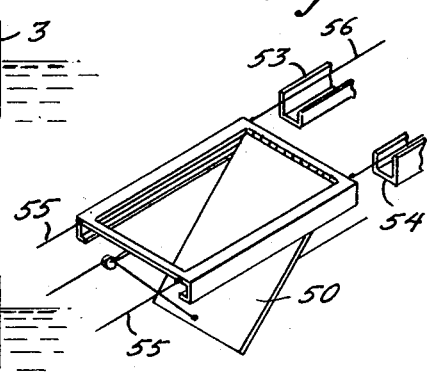
FIG. 10 is an enlarged, perspective view of the pressure plate and rail support which is secured to the hull of the vessel.
Figure 9:
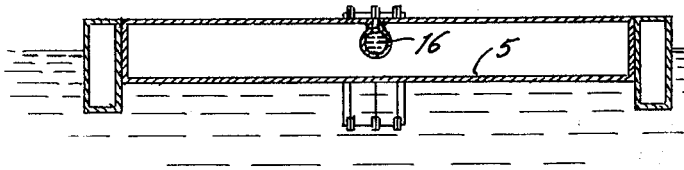
FIG. 9 is a front elevational view of the vessel taken along the line 9—9 of FIG. 2.

I have found it desirable to provide for additional pressure by use of a pressure plate 50 which can be lowered and held at an angle of inclination to the bottom hull by the cables 51 and 52 activated by deck control 57 as illustrated in FIGS. 2 and 10. Such plate 50 can be moved backwards and forwards along the slides 53, 54 by the cables 55 and 56 at deck control 58. By adjustment of the plate 50 beneath the mouth 17 of the pressure chamber 16 the amount and place of the pressure may be varied. When not needed the force or pressure plate 50 is positioned so that it approximately parallels the bottom hull of the vessel to thereby reduce the effort required to move the vessel through the water. Support members 59 extend from the bottom hull sections 4 and 5 to secure the slides members 53, 54 along which the plate 50 may be moved.

As may be seen in FIG. 2, the position of the top of the plate 50 and the plane of such plate relative to the mouth 17 determines the area in the pressure chamber which will be most directly affected by the force or pressure wave generated from the face of the pressure plate 50. Such pressure wave has a piston effect on the oil and water in the pressure chamber 16 resulting in a substantial force tending to drive the oil toward exit 18. If desired the sides of the pressure plate may be enclosed to further concentrate the pressure wave against the oil and water in the pressure chamber.

Having described this invention, what I claim is:

1. Apparatus for a collecting liquid from the surface of a body of water comprising,
   a. a vessel floating in said body of water,
   b. collection means having a tapered shape carried on the underside of said vessel, the wider end of said collection means forming an inlet and facing the leading end of said vessel, said collection means having an open bottom, a closed top, and sides projecting away from said vessel with the lower edges of said sides extending beneath the surface of said body of water, said closed top being upwardly inclined in the direction of the leading edge of said vessel relative to the surface of said body of water, said sides including sections extending upwardly above the plane occupied by said closed top and arranged to define riser chambers located above the plane of said closed top, said chambers in fluid communication with the lower surface of said closed top and extending along the interior portions of said sides, and
   c. a collection chamber having an inlet opening in communication with said riser chambers, said collection chamber having an outlet opening at the top thereof, said outlet opening defining an area less than the area defined by said collection chamber inlet opening.

2. Apparatus as set forth in claim 1 wherein said closed top is formed by that portion of the underside of said vessel located between said sides.

3. The apparatus set forth in claim 1 further including a joinder plate supported beneath said collection chamber adjacent said inlet opening for increasing the pressure in said collection chamber, said plate being downwardly inclined in the direction of said leading edge of said vessel relative to the surface of said body of water, the surface of said plate facing the surface of said body of water being in fluid communication with said inlet opening for directing water and liquid passing underneath said vessel toward said inlet opening.

4. Apparatus as set forth in claim 3 further including a pressure plate carried on the underside of said vessel adjacent said inlet opening of said collection chamber, said pressure plate spaced from said joinder plate in the direction of the leading edge of said vessel and located generally lower than said joinder plate, and adjusting means located in said vessel for changing the angle of inclination of said plate relative to the surface of said body of water, whereby water and liquid passing underneath said vessel may be diverted toward said inlet opening to increase the pressure in said collection chamber.

* * * * *